Figure 5:
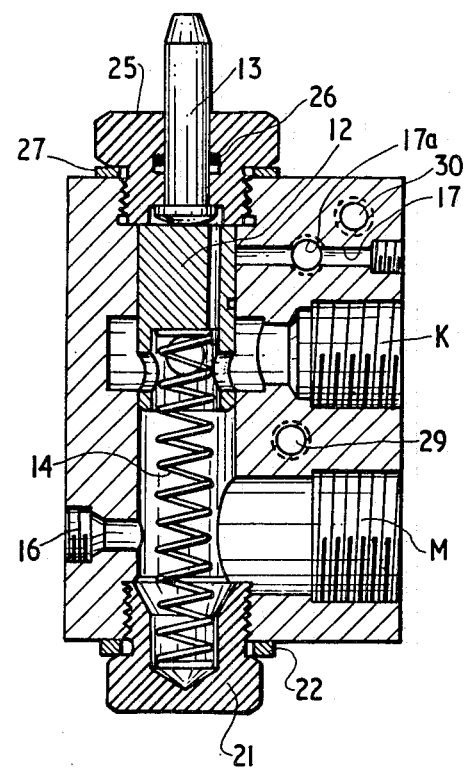

United States Patent [19]

White

[11] 4,175,909

[45] Nov. 27, 1979

[54] VALVE MEANS FOR USE IN CONTROLLING OPERATION OF A HYDRAULIC MOTOR

[75] Inventor: Gordon D. White, Tewkesbury, England

[73] Assignee: Bullough Limited, Epsom, England

[21] Appl. No.: 818,833

[22] Filed: Jul. 25, 1977

[30] Foreign Application Priority Data

Jul. 23, 1976 [GB] United Kingdom ............... 30922/76

[51] Int. Cl.² ........................................... F15B 13/04
[52] U.S. Cl. ..................................... 415/145; 30/381;
184/15 R; 137/625.12; 137/882
[58] Field of Search ................. 30/381, 382, 383, 384,
30/385, 386, 387; 184/15 R; 137/625.12,
625.38, 882; 251/325, 282; 60/494; 415/145

[56] References Cited

U.S. PATENT DOCUMENTS

| 280,247 | 6/1883 | See | 60/494 |
|---|---|---|---|
| 419,076 | 1/1890 | Roovers | 137/625.38 |
| 771,486 | 10/1904 | McCarthy | 251/325 X |
| 900,506 | 10/1908 | Forbes | 251/282 X |
| 973,663 | 10/1910 | Jacobs | 251/325 |
| 1,859,876 | 5/1932 | Koplin | 137/625.38 X |
| 1,868,811 | 7/1932 | Yarnall | 251/325 X |
| 2,270,641 | 1/1942 | Ruppert et al. | 251/325 X |
| 2,596,534 | 5/1952 | Crake | 137/625.12 |
| 2,669,233 | 2/1954 | Friend | 137/887 X |
| 3,768,518 | 10/1973 | Roth et al. | 251/325 X |
| 4,011,888 | 3/1977 | Whelchel et al. | 137/881 X |

*Primary Examiner*—Gerald A. Michalsky
*Attorney, Agent, or Firm*—Young & Thompson

[57] ABSTRACT

The control valve mechanism of, for example a hydraulic motor for a chain saw, includes a two-position spool having a hollow interior permanently connected to reservoir and a cylindrical wall formed with ports which are closed in one valve position and open in the other valve position. During movement of the spool into the motor-operating position, a lubricant passageway is opened before the motor is fully operational.

4 Claims, 7 Drawing Figures

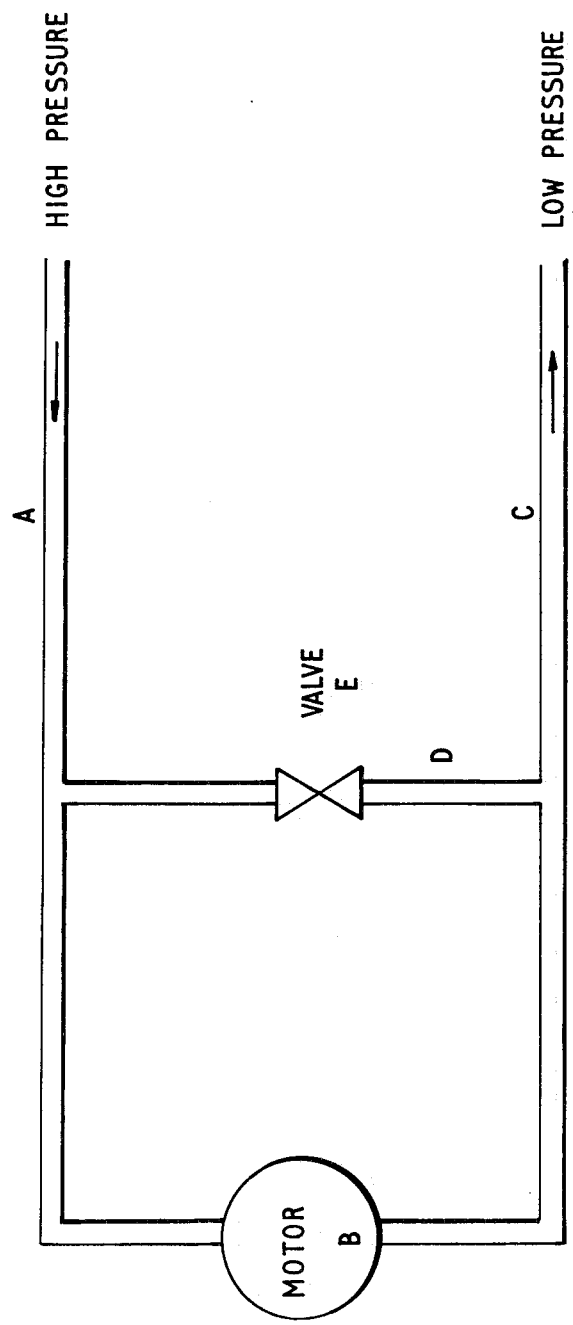

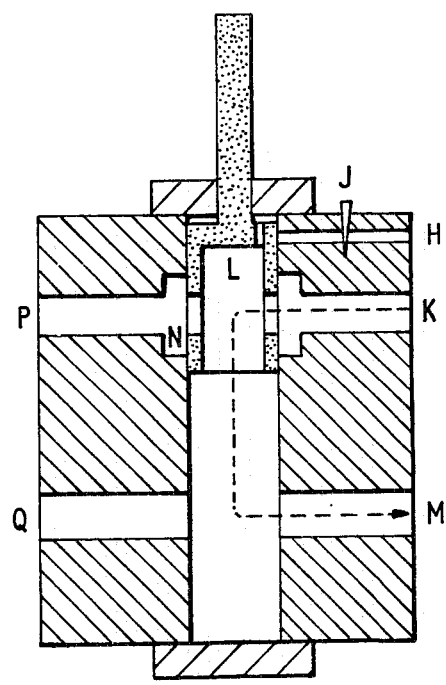
—FIG.2.—
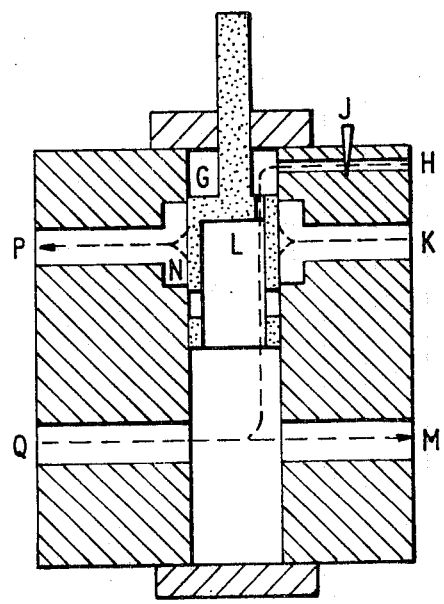
—FIG.3.—

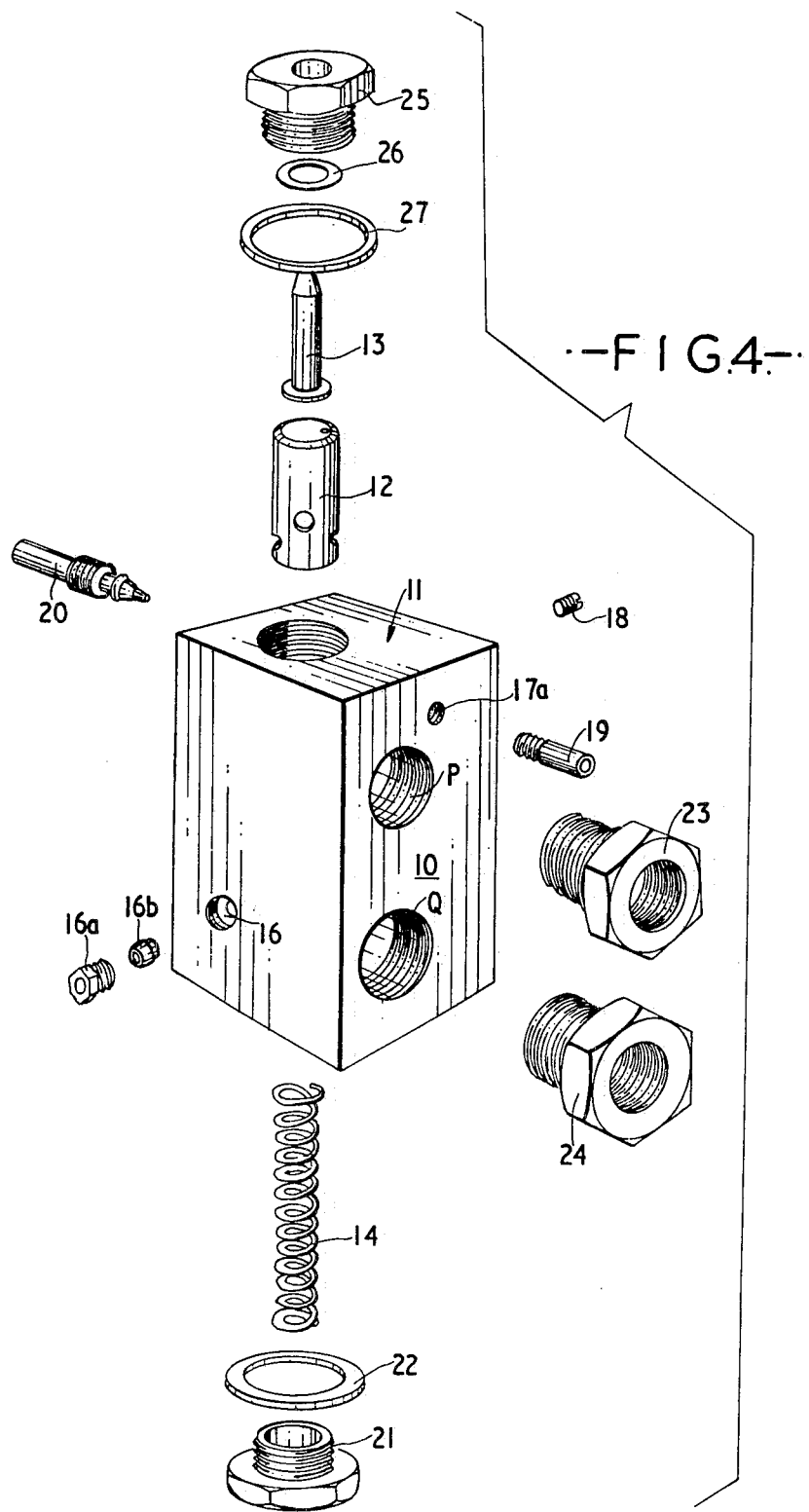

VALVE MEANS FOR USE IN CONTROLLING OPERATION OF A HYDRAULIC MOTOR

This invention relates to valve means for use in controlling operation of a hydraulic motor.

When a hydraulic motor is used to drive, for example, a chain saw or a sanding disc, it is necessary to provide a free-wheel arrangement to prevent immediate braking or stopping of the rotary element of the hydraulic motor when the high pressure hydraulic supply to the motor is terminated. It is accordingly an object of the invention to provide a control valve means which permits free-wheeling of a hydraulic motor.

During operation of a chain saw it is necessary that a supply of lubricant should be fed to the chain but it is also necessary that, when the chain saw is not in use, the supply of lubricant should be terminated. In addition, it is desirable that, prior to the chain coming into operation, a charge of lubricant should be deposited on the chain.

It is accordingly a further object of the invention to provide control valve means for a hydraulic motor of a chain saw to enable the above lubrication facilities to be obtained.

According to a first aspect of the invention there is provided control valve means for a hydraulic motor which includes a valve member movable between a first position in which high pressure fluid is fed to the hydraulic motor and a second position in which the high pressure source is connected to reservoir, the valve member comprising a spool having a hollow interior which is connected permanently to reservoir and having a cylindrical wall formed with ports which are closed in the first position of the valve member to prevent flow of high pressure fluid into the interior of the spool but which are open when the valve member is in its second position.

The spool is preferably disposed within a valve block having a gallery providing communication (around the spool) between the high pressure inlet port from the supply and a high pressure delivery port leading to the motor with the arrangement such that the two high pressure ports are in continuous communication.

The ports formed in the cylindrical wall of the spool are positioned so that, in the first position of the valve member, they are just out of communication with the gallery whereas, when the valve member is in its second position, the ports in the spool provide communication between the gallery and the interior of the spool and thence the reservoir so that the high pressure supply passes directly to the reservoir instead of to the motor.

According to a second aspect of the invention there is provided valve means for a hydraulic motor which includes a spool valve which controls discharge of the hydraulic fluid along a lubricant supply passage as well as controlling operation of the hydraulic motor, the arrangement being such that, when the spool is moved out of its at rest position, the lubricant supply passage is opened before the hydraulic motor is fully operational.

Figure 7:
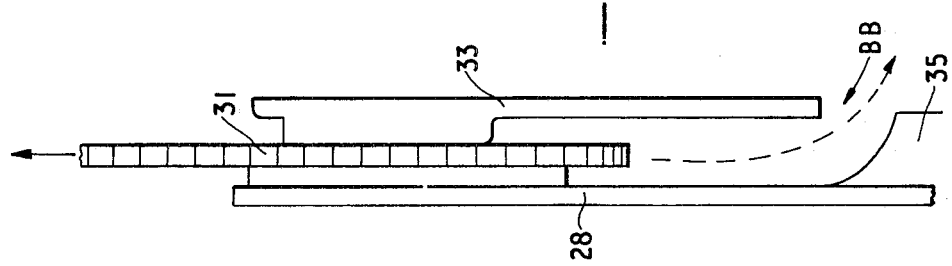
Figure 6:
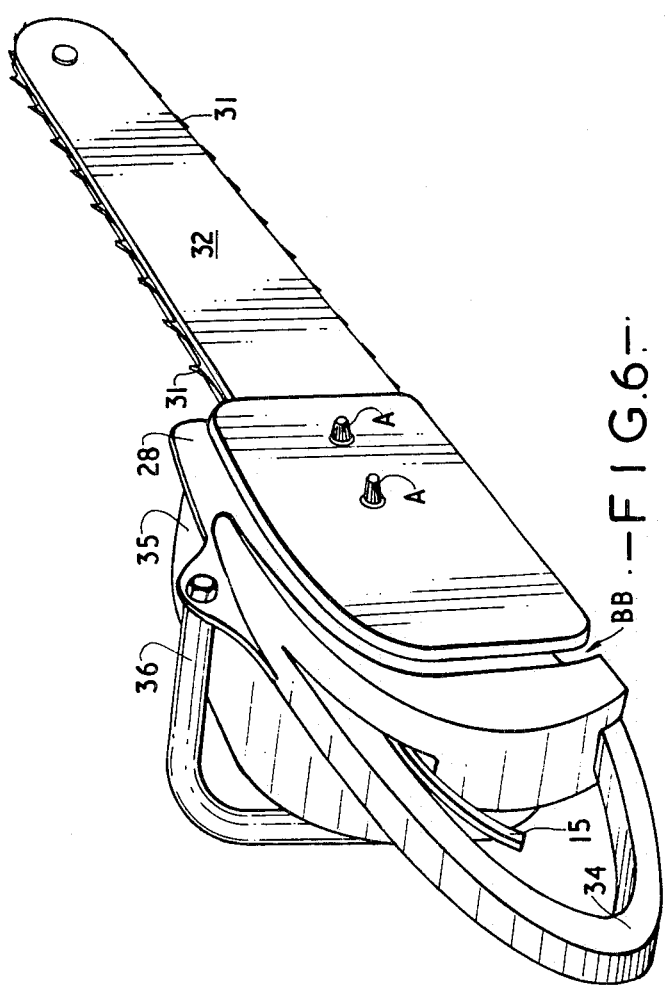

The invention will now be described by way of example with reference to the accompanying drawings in which:

FIG. 1 shows the supply circuit of a hydraulic motor,
FIG. 2 shows the control valve in its "off" position,
FIG. 3 shows the control valve in its "on" position (FIGS. 2 and 3 being diagrammatic),
FIG. 4 is an exploded perspective view of the control valve in actual physical form,
FIG. 5 is a sectional view of the control valve of FIG. 4,
FIG. 6 is a perspective view of a chain saw incorporating the control valve, and
FIG. 7 is a sectional view of part of the chain saw.

The general circuit arrangement shown in FIG. 1 includes a supply line A along which hydraulic fluid is supplied from a high pressure source (not shown) for delivery to the motor B and thence to the low pressure discharge line C which leads to reservoir. When the motor is not in its operational condition, the hydraulic fluid or oil is directed along a by-pass channel D by means of a valve E and thence to the low pressure discharge line C. In this condition, in which the valve E is open, the lines to and from the motor B are open to the oil supply and discharge lines so that equal pressure conditions now exist on each side of the motor. The motor is thus free to turn under its own residual energy and, if the motor drive element is rotating, it will continue to rotate and will act as a pump to pass oil from the line A to line C. However, due to the equal pressure conditions it will gradually run down and finally stop. Hence, if the motor is arranged to drive a chain saw or sanding disc, the motor output shaft will be able to free-wheel when the drive to the hydraulic motor is terminated thus avoiding the likelihood of damage, particularly when the driven member is a sanding disc.

FIGS. 2 and 3 illustrate diagrammatically the construction of the valve to provide the facility described above. In the non-operational or "off" condition, oil entering the high pressure port K will pass through holes in the periphery of the spool L into the hollow interior of the spool L and thence to the low pressure port. The spool L is surrounded by a gallery N and, when the spool is in its operational or "on" position, the spool acts to prevent oil passing to port M since the holes in the periphery of the spool L will then be shrouded by the wall of the bore in which the spool is disposed. Under this condition the high pressure oil entering through port K must now travel through the gallery N and leave the valve through port P for passage to the motor B. The low pressure oil discharged by the motor B passes along a return line through the port Q and then passes directly via port M to the reservoir.

As shown in FIGS. 2 and 3 the crown of the spool L has a passage which is drilled through to provide communication between the interior of the spool and a space G adjacent the top of the valve block. The purpose of this passage is to provide hydraulic balancing i.e. to prevent a hydraulic lock condition. This means that there will always be low pressure oil available in the space G when the chain saw or sanding disc is in use whereas, in the rest condition, the spool L covers and seals off a passage H extending from this space G, passage H being a lubricant supply passage.

When the spool L is depressed, i.e. in the operational condition of the motor, passage H is uncovered and exposed to the low pressure oil supply before the spool is moved sufficiently far to allow high pressure oil to be fed to the motor B. It will thus be seen that low pressure oil is delivered along the passage H for lubrication purposes before the motor B and chain have commenced operation. Lubrication is thus ensured before the motor reaches its full speed and the chain is driven at its full operational speed. The supply of oil to the chain is regulated by means of a needle valve J which can be set manually to provide just the required amount of oil for lubrication purposes.

The actual physical construction of the control valve is illustrated in FIGS. 4 and 5, the face 10 of the control valve block 11 being provided with ports P and Q and the adjacent face of the control valve block being provided with ports K and M. The spool comprises an appropriately drilled cylindrical element 12 and a separate control valve plunger 13, the cylindrical element 12 being acted upon by a spring 14 whereby the spool L is normally in its "off" position whereas the spool L is movable under the action of a trigger 15 (see FIG. 6), which bears on the plunger 13, into its "on" position.

The hydraulic motor B may be of the type which has an external drain and thus, in order to return the oil which has passed to drain into the circulating system, the control valve block 11 is provided with a drain port 16 in line with port M whereby the oil can return to the low pressure side of the system. Port 16 receives a retaining bush 16a and a sealing member 16b. As shown in FIGS. 4 and 5, the actual form of the lubricant supply arrangement includes a drilled bore 17 which is closed by a plug 18 and communicates with the space G at the upper end of the chamber in which the spool L is located. The bore 17 is at right angles to an intersecting bore 17a which is provided at one end with a lubrication take-off tube 19 and at its other end with an adjustment screw 20 to permit the operator to control the rate at which hydraulic fluid for lubrication purposes is drawn off.

Other parts of the control valve mechanism illustrated in FIGS. 4 and 5 are a screw-threaded plug 21 having a seal 22 and acting as a seating for the spring 14, coupling members 23 and 24 which screw into the bores of ports P and Q and provide connectors to which the hydraulic lines to the motor B are attached and a plug 25, having seals 26 and 27, which closes the upper end of the spool chamber and provides a mounting for the operating plunger 13. The mode of operation of the control valve and its components will be apparent from the comments and description set out above in relation to FIGS. 1 to 3.

FIGS. 6 and 7 illustrate the construction of a chain saw which includes a chassis 28 to which the control valve block 11 is attached by means of bolts which pass through through-holes 29 and 30 in the block 11. A sprocket wheel (not shown) is mounted on the output shaft of the motor B and drives a chain 31 which is supported by means of a conventional chain support 32, the chain support 32 being disposed between the chassis 28 and a guard 33 with adjustment screws A providing for adjustment of the position of the chain support 32 and hence of the tension in the chain. The chassis 28 is formed integrally with a first handle 34 and cover 35, the cover 35 extending over the hydraulic motor and control valve assembly and being so shaped that it co-operates with the guard 33 to define a chip-clearing gap BB through which, in use, chips of wood and the like are discharged.

A second handle 36, of U-shaped form, is bolted to the chassis over the motor and valve assembly so that the chain saw can be held firmly in both hands by means of the two handles 34 and 36 with ready access to the operating trigger 15.

I claim:

1. A hydraulic control circuit comprising a high pressure supply line for connection to a high pressure hydraulic fluid source, a low pressure discharge line for returning hydraulic fluid to said source, a hydraulic motor having an inlet port and an outlet port and control valve means including a valve member movable between a first position in which the high pressure supply line is connected to the inlet port of the hydraulic motor and a second position in which the high pressure supply line is connected to the discharge line, the valve member including a spool having a hollow interior which is connected permanently to the discharge line and the outlet port of the motor and having a cylindrical wall formed with ports which are closed in the first position of the valve member to prevent flow from the high pressure hydraulic fluid source into the interior of the spool and between the interior of the spool and the inlet port of the motor but which are open when the valve member is in its second position, the spool being movable within a valve block having a lubricant supply passage, the lubricant supply passage being closed when the spool is in its second position but being opened when the spool is moved from its second position towards its first position and before the spool reaches its first position.

2. A hydraulic control circuit according to claim 1, wherein the valve member is urged by a spring into its second position and is movable upon manual actuation of a trigger into its first position.

3. A hydraulic control circuit acccording to claim 1, wherein the valve block has a gallery providing communication (around the spool) between a high pressure inlet port from the supply line and a high pressure delivery port leading to the inlet port of the motor such that the two high pressure ports are in continuous communication.

4. A hydraulic control circuit according to claim 3, wherein the ports formed in the cylindrical wall of the spool are so positioned that, in the first position of the valve member, they are out of communication with the gallery whereas, when the valve member is in its second position, the ports in the spool provide communication between the gallery and the interior of the spool and thence the discharge line so that, in use, the high pressure supply passes directly to the discharge line instead of to the motor.

* * * * *